United States Patent
Rando et al.

(10) Patent No.: US 6,572,019 B1
(45) Date of Patent: *Jun. 3, 2003

(54) COMPACT SCANNER MODULE MOUNTABLE TO POINTING INSTRUMENT

(75) Inventors: Joseph F. Rando, Los Altos Hills, CA (US); Brad R. Reddersen, Eugene, OR (US)

(73) Assignee: PSC Scanning, Inc., Eugene, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/055,507

(22) Filed: Jan. 23, 2002

Related U.S. Application Data

(63) Continuation of application No. 09/904,970, filed on Jul. 12, 2001, now abandoned, which is a division of application No. 09/174,266, filed on Oct. 16, 1998, now Pat. No. 6,290,134, which is a division of application No. 08/662,514, filed on Jun. 13, 1996, now Pat. No. 5,874,722, which is a continuation of application No. 08/277,410, filed on Jul. 19, 1994, now abandoned.

(51) Int. Cl.$^7$ ................................................. G06K 7/10
(52) U.S. Cl. ........................... 235/472.01; 235/472.02
(58) Field of Search ..................... 235/472.01, 472.02

(56) References Cited

U.S. PATENT DOCUMENTS

| | | |
|---|---|---|
| 3,978,318 A | 8/1976 | Romeo et al. |
| 4,184,044 A | 1/1980 | Zwerenz |
| 4,538,072 A | 8/1985 | Immler |
| 4,659,932 A | 4/1987 | Roll |
| 4,690,486 A | 9/1987 | Roll et al. |
| 4,733,067 A | 3/1988 | Oinoue et al. |
| 4,738,500 A | 4/1988 | Grupp et al. |
| 4,772,784 A | 9/1988 | Yoshitoshi et al. |
| 4,823,331 A | 4/1989 | Yoshitoshi et al. |
| 4,873,429 A | 10/1989 | Kume et al. |

(List continued on next page.)

FOREIGN PATENT DOCUMENTS

| | | |
|---|---|---|
| EP | 0 650 133 A2 | 4/1995 |
| GB | 2 021 762 A | 12/1979 |
| GB | 2 175 705 A | 12/1986 |
| JP | 62-196880 A | 8/1987 |
| JP | 62-197931 A | 9/1987 |
| JP | 63-090886 A | 4/1988 |
| JP | 63-121016 A | 5/1988 |
| JP | 63-146241 A | 6/1988 |
| JP | 63-193336 A | 8/1988 |
| JP | 63-197045 A | 8/1988 |

(List continued on next page.)

OTHER PUBLICATIONS

Nakamura et al., "Compact Two–Beam Head with a Hybrid Two–Wavelength Laser Array for Magneto–Optic Records," Proc. Int. Symp. on Optical Memory, *Japanese Journal of Applied Physics*, vol. 26 (1987) Supplement 26–4, pp. 117–120.

Primary Examiner—Harold I. Pitts
(74) Attorney, Agent, or Firm—Stoel Rives LLP

(57) ABSTRACT

Method and apparatus for scanning items with a compact scanner which is mountable onto and/or integral with a pointing instrument. The scanner module may be equipped with an aiming beam for additional help in directing the scan line toward the object to be read. The pointing instrument may be a pen or pencil or alternately a pen-based computer stylus for use with an integrated data terminal module operably connected to the scanner module. Security for preventing separation of the module may be provided by a wireless link.

30 Claims, 14 Drawing Sheets

U.S. PATENT DOCUMENTS

| | | |
|---|---|---|
| 4,893,296 A | 1/1990 | Matsumoto et al. |
| 4,897,828 A | 1/1990 | Yoshitoshi et al. |
| 5,005,162 A | 4/1991 | Mitsumori et al. |
| 5,060,217 A | 10/1991 | Kume |
| 5,144,614 A | 9/1992 | Kume et al. |
| 5,181,193 A | 1/1993 | Kume et al. |
| 5,252,816 A | 10/1993 | Onimaru |
| 5,262,627 A | 11/1993 | Shepard |
| 5,305,181 A | 4/1994 | Schultz |
| 5,367,151 A | 11/1994 | Dvorkis et al. |
| 5,369,262 A | 11/1994 | Dvorkis et al. |
| 5,371,347 A | 12/1994 | Plesko |
| 5,479,001 A | 12/1995 | Kumar |
| 5,506,394 A | 4/1996 | Plesko |
| 5,625,483 A | 4/1997 | Swartz |
| 5,793,032 A | 8/1998 | Bard |
| 5,874,722 A | 2/1999 | Rando et al. |
| 5,880,452 A | 3/1999 | Plesko |
| 5,966,230 A | 10/1999 | Swartz et al. |
| 6,021,947 A | 2/2000 | Swartz |
| 6,098,886 A | 8/2000 | Swift et al. |
| 6,102,294 A | 8/2000 | Swartz et al. |
| 6,290,134 B1 | 9/2001 | Rando et al. |

FOREIGN PATENT DOCUMENTS

| | | |
|---|---|---|
| JP | 63-090887 A | 9/1988 |
| JP | 01-213840 A | 8/1989 |
| JP | 01-237939 A | 9/1989 |
| JP | 01-267853 A | 10/1989 |
| JP | 03-183035 A | 8/1991 |
| JP | 03-214102 A | 9/1991 |
| JP | 03-214112 A | 9/1991 |
| JP | 05-166240 A | 7/1993 |
| JP | 05-198030 A | 8/1993 |
| JP | 05-258342 A | 10/1993 |
| JP | 05-334761 A | 12/1993 |

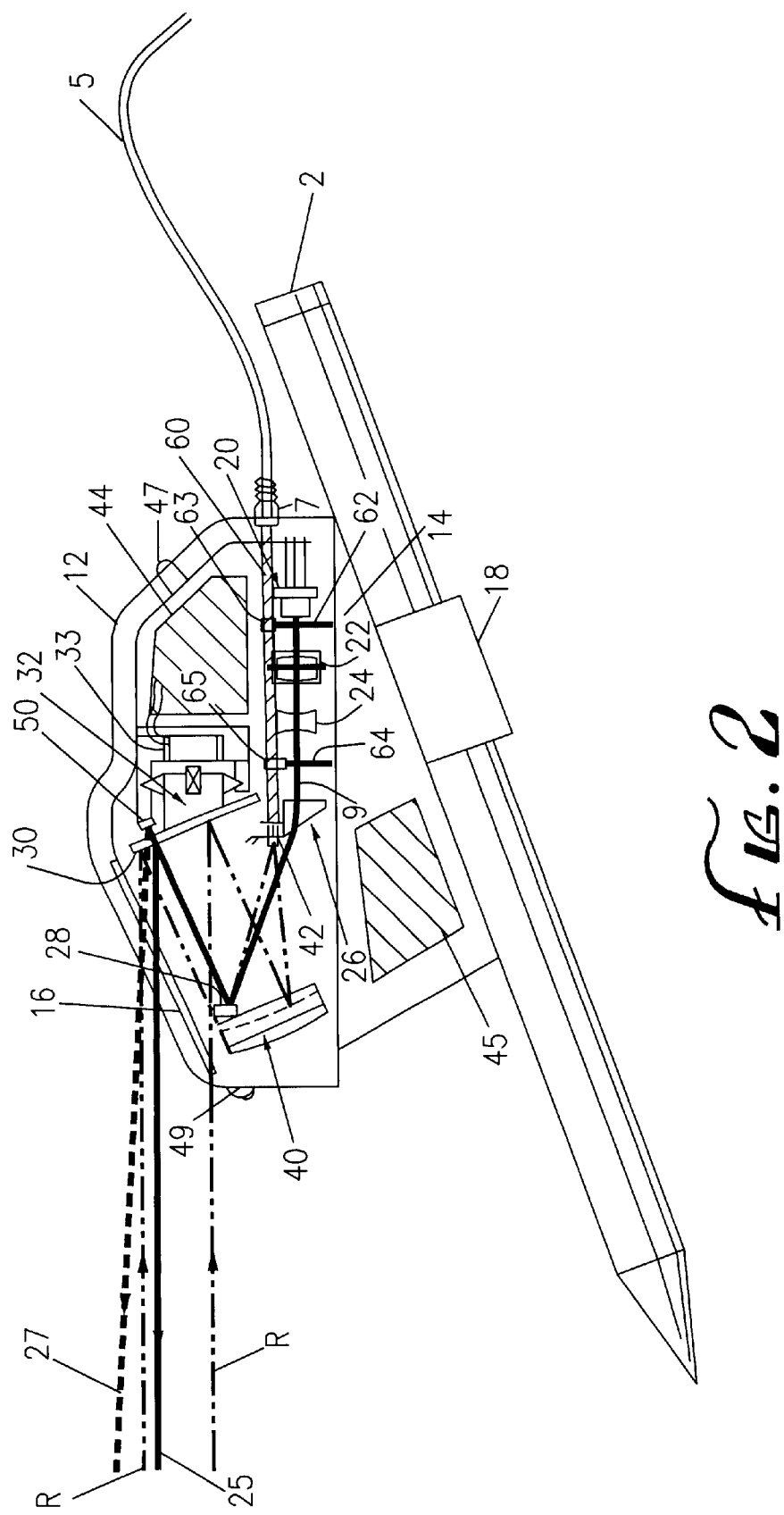

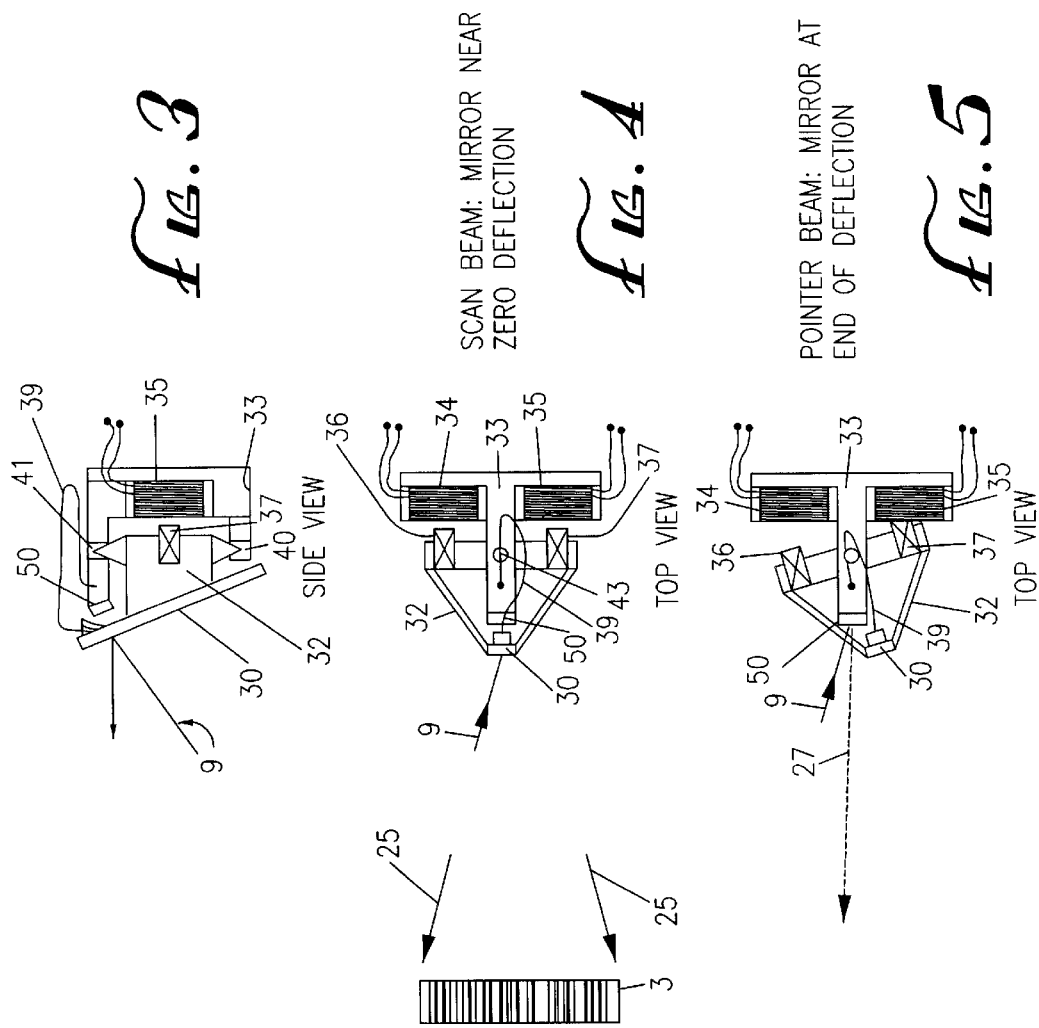

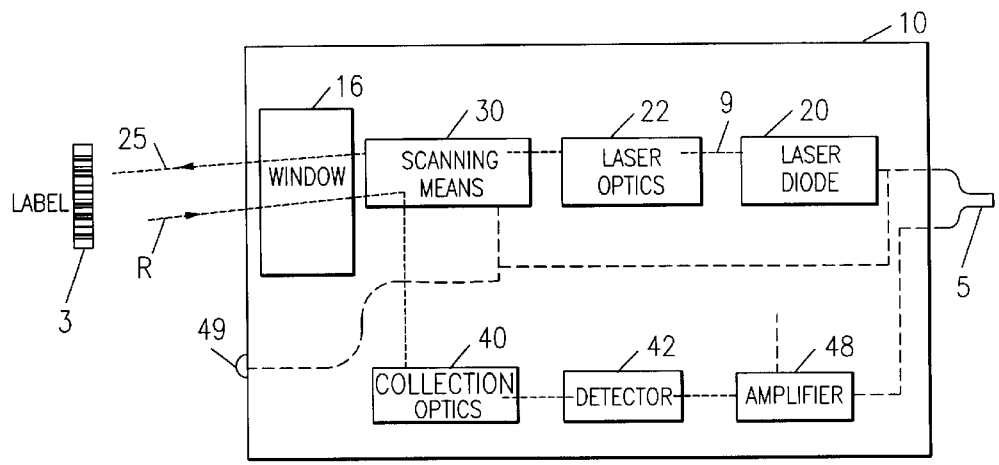
RETRODIRECTIVE COLLECTION
BLOCK DIAGRAM OF THE STYLUS MOUNTED LABEL READER
*fig. 5*A
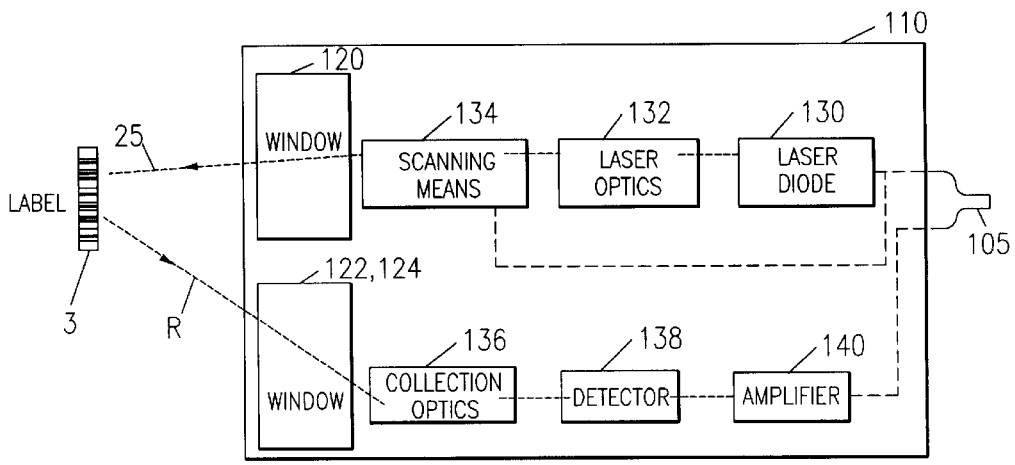
DIRECT COLLECTION
BLOCK DIAGRAM OF THE STYLUS MOUNTED LABEL READER
*fig. 6*A

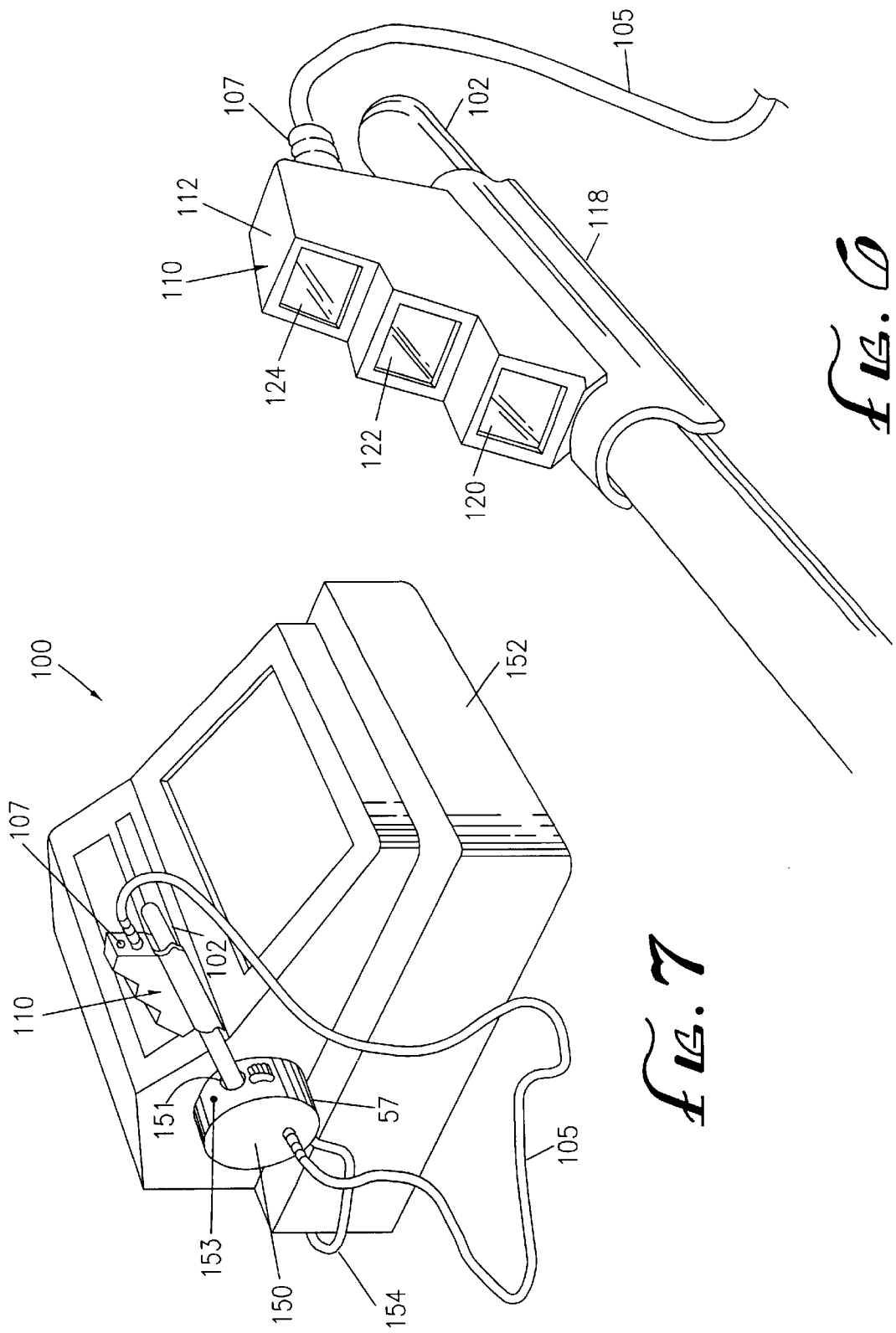

BLOCK DIAGRAM OF THE STYLUS MOUNTED LABEL READER
AND STAND

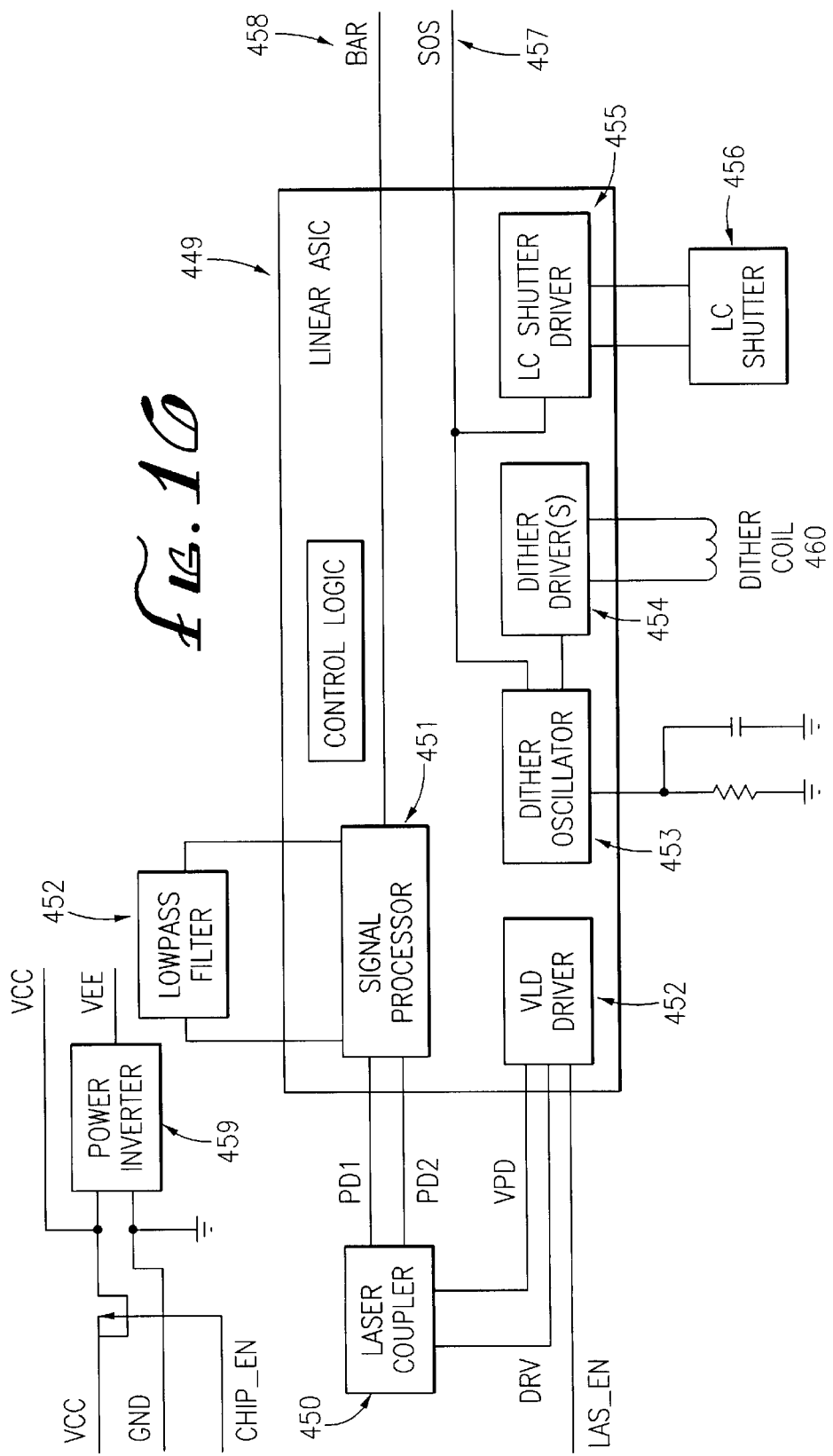

COMPACT SCANNER MODULE MOUNTABLE TO POINTING INSTRUMENT

This application is a continuation of application Ser. No. 09/904,970 filed Jul. 12, 2001 abandoned, which is a divisional of application Ser. No. 09/174,266 filed Oct. 16, 1998 U.S. Pat. No. 6,290,134, which is a divisional of application Ser. No. 08/662,514 filed Jun. 13, 1996 U.S. Pat. No. 5,874,722; which is a continuation of application Ser. No. 08/277,410 filed Jul. 19, 1994 abandoned.

BACKGROUND OF THE INVENTION

The field of the present invention generally relates to data reading apparatus. More particularly, the field of the present invention relates to a method and apparatus for scanning items such as those bearing a bar code symbol.

Bar code scanners are well known for scanning the universal product code ("UPC") and other types of bar codes on packages or containers, particularly in retail stores. Generally, in retail stores, bar code scanners are set up at check-out stands or are built into a horizontal check-out counter so that a laser beam is scanned up through a transparent window, defining a number of different scan lines. Normally, packages are placed by the customer on a counter, deck or conveyor. A check-out person then takes each package, visually locates the UPC or other bar code label on a surface of the package and moves the package through the laser's scanning area.

Handheld devices have also been employed to read bar codes. One such handheld device is the wand. The wand has a detector positioned in its tip which is manually drawn across the bar code. In such a device, the wand must be oriented in the proper fashion and drawn across the bar code at the correct speed and preferably in the proper direction. For each complete pass across the bar code, the wand has one opportunity (i.e., one scan) to make a read. Wands frequently require repeated passes across the bar code to achieve a successful read.

Another device is the bar code scanner such as shown in U.S. Pat. No. 5,146,463, to Joseph Rando, which is a handheld scanning device. The scanner body is generally in the shape of a gun which may be pointed or aimed at the bar code. The user activates the scanning beam by actuating a trigger switch, turning on the laser light source which generates a laser beam. The laser beam is reflected off a rotating polygon mirror to produce a multitude of scanning sweeps across the bar code. The scanner may also generate an aiming beam to aid aiming of the scanned beam.

In some applications, it is desirable for the operator to have a data terminal associated with the reader apparatus. A data terminal typically comprises a key pad to permit manual data entry. There have been attempts to integrate a reading device, such as a handheld scanner, with a data terminal. One such device is the Symbol Technologies LRT3800 scanner/portable data terminal system in which a portable data terminal is mounted on top of the gun-shaped handheld scanner. In both the integrated and non-integrated handheld scanner and data terminal systems, the user prefers to use the "precision hand" (i.e. the right hand for a right-handed person) for both aiming the scanner and keying in data entry. In either system, when manually keying in data, if the user is using the precision hand to hold and aim the scanner, the user must either switch the handheld unit to the "off" hand (i.e. the left hand for a right-handed person) or use his/her off hand to actuate keys on the data terminal. Alternately, the user would aim and use the scanner with the off hand to keep the precision hand free for manual data entry.

SUMMARY OF THE INVENTION

The present invention relates to a method and apparatus for scanning items with a scanner being mounted to and/or integral with a pointing instrument, such as for example a handheld writing utensil. In a preferred embodiment, the scanner is assembled in a scanner module which is removably mounted to the pointing instrument. The scanner module may be equipped with an aiming beam for additional help in directing the scan line toward the object to be read. In certain embodiments, the pointing instrument may comprise a pen or pencil, while in other applications it may comprise a pen-based computer stylus for use with an integrated data terminal module operably connected to the scanner module or the data terminal module may comprise a light actuable display screen and the pointing instrument comprising a light pen for operating the data terminal module. Another embodiment is a compact mechanism comprising an integrated diode source, scan mechanism and associated electronics configured as a laser diode coupler based optical scanning system.

BRIEF DESCRIPTION OF THE DRAWINGS

FIG. 2 is a diagrammatic cross sectional view of the scanner of FIG. 1;

FIG. 3 is a detailed side view of the scanning mechanism of the scanner module of FIGS. 1 and 2;

FIG. 4 is a top view of the scanning mechanism of FIG. 3;

FIG. 5 is a top view of the scanning mechanism of FIG. 3 with the scanning mirror permitting the beam the mirror to produce an aiming beam;

FIG. 5A is a block diagram of a scanner module configuration usable in the scanner of FIGS. 1–5;

FIG. 6 illustrates an alternate embodiment scanner module;

FIG. 6A is a block diagram of a retrodirective scanner module configuration usable in the scanner of FIG. 6;

FIG. 7 illustrates an integrated scanner module and data terminal system with the scanner module holder mounted on the terminal module;

FIG. 16 is a block diagram for the electronics subsystems that may be incorporated in a laser diode coupler ASIC;

DETAILED DESCRIPTION OF THE PREFERRED EMBODIMENTS

The preferred embodiments will now be described with respect to the drawings. To facilitate description, any numeral identifying an element in one figure will represent the same element in any other figure.

Figure 1:
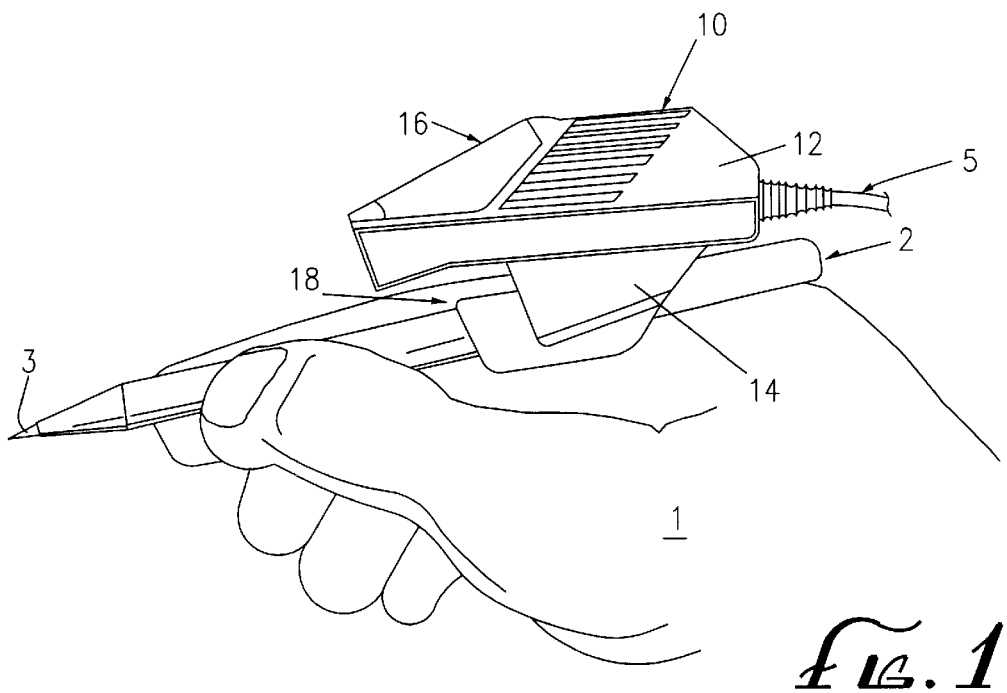
FIG. 1 illustrates a scanner module according to an embodiment of the present invention configured to be mounted on a pointing instrument.

FIGS. 1 and 2 illustrate a scanner 10 configured to be mounted on a pointing instrument 2. The scanner 10 is compact and lightweight so as to be readily manipulated by the user and not overly disturb the balance of the pointing instrument 2 in the user's hand 1.

The scanner module 10 includes a housing 12 which has a support bracket 14 with a clip 18 which is spring loaded to be securely and removably attached to the pointing instrument 2. The clip or holder 18 may attach to a particularly designed aiming instrument or may be configured to attach to conventional writing instruments, such as a pencil or a ballpoint pen.

The scanner module 10 includes a light source, preferably a laser diode 20, which is focused by focusing element (or elements), shown in this embodiment as a focusing lens 22, to an outgoing light beam 9. The focusing lens 22 may be integrally formed with the laser diode 20 in a common barrel housing. The outgoing light beam 9 may be further focused by a second focusing element 24. The second focusing element 24 may comprise a lens, an aperture, or a gate mechanism which adjusts the waist location for the outgoing beam 9. The waist location may either be adjusted in one axis (typically the resolving axis, i.e., the axis along the scanning direction) or the waist may be adjusted in both in the resolving and the non-resolving axes. As such, the aperture may be rectangular, round, or any other desirable shape depending upon the application. Though a fixed focus focusing system is preferred, it may also be desirable to have a variable focusing mechanism to provide a varying waist location. A preferred variable focus device is disclosed in U.S. patent application Ser. No. 07/992,932 filed Dec. 18, 1992 U.S. Pat. No. 5,347,121 and U.S. patent application Ser. No. 08/164,300 filed Dec. 7, 1993 U.S. Pat. No. 5,479,011, herein incorporated by reference. Other variable focus devices may be employed by one skilled in the art given the disclosure herein.

Once focused to the desired waist location, the outgoing light beam 9 is deflected by a prism 26 (or alternately a mirror) toward a fold mirror 28 and then onto the scanning mirror 30. The scanning mirror 30 as shown in FIGS. 2–5 is mounted on an oscillating frame member 32 which is pivotally mounted between jewel bearings 40, 41 which allow the frame 32 to pivot freely a few degrees in either direction. The jewel bearings 40, 41 are mounted in a fixed support 33. A spring 39 attached between the fixed support 33 and the oscillating frame 32/mirror 30 returns the frame 32 to the center position (as shown in FIG. 4) in the absence of the application of any magnetic forces.

The oscillating frame 32 includes permanent magnets 36, 37 positioned on opposite sides of the pivoting axis 43, the magnets 36, 37 corresponding in position to solenoids 34, 35 (electro-magnets) mounted on the fixed support 33. The permanent magnet 36 is attracted or repelled to the solenoid coil 34 as the flow of current applied to the coil is allowed to alternate at the resonant frequency. The permanent magnet 37 is attracted or repelled to the solenoid coil 35 as the flow of current is allowed to alternate the resonant frequency. The oscillation is started by applying a sharp pulse of current to coil 35. The signal from coil 34 is then amplified and applied to the coil 35. This feedback produces a sustained oscillation at the resonant frequency. Other driving methods using two coils and two magnets may be implemented by one skilled in the art given the disclosure herein.

By the oscillation of the mirror 30, the outgoing light beam 9 is scanned over a given angle by the mirror 30 producing a scanning beam 25 (typically a scan line) to scan across the bar code 3. Return light R from the scanned beam 25 reflecting or scattering off the bar code 3 (return light being shown by the dash lines R) returns and reflects off the scanning mirror 30 where it is collected by a concave collection mirror 40 which focuses the beam onto a detector 42. An electric signal, corresponding to the bar code label information detected, is amplified by electronics in a circuit board 45 and transmitted through cable 5 for further decoding and transmission. Decoding electronics may be provided within the scanner module 10, but it is preferred that the decoding hardware be located elsewhere to aid compactness of the structure of the scanner module 10. When a successful read of the bar code 3 has been accomplished, indicator 47, such as an indicator light or LED, may light to signify a successful read. Alternately, the element 47 may comprise another type of indicator such as an LCD display providing instructions or other information to the user such as successful read, a reference code, item identification, or authorization code. It should be noted that some wiring and electrical interconnection has been omitted from the drawings for simplification but would be readily implemented by one skilled in the art given the drawings and description herein.

The scanner module 10 also includes provisions for producing a separate aiming beam. As viewed in FIG. 5, as the scanning mirror 30 pivots to the extreme side position, the outgoing light beam 9 bypasses the scanning mirror 30 and strikes a stationary mirror 50 located on the fixed support 33 behind the scanning mirror 30. The outgoing beam 9 reflecting off the fixed mirror 50 is not scanned and thereby creates a pointing or aiming beam 27 (shown as a dotted line) to assist in aiming of the scanner. It is noted that the sinusoidal motion of the mirror 30 is several times greater than the width of the scanning mirror 30. In a sinusoidal scanner such as this, the scanned beam is most useful during the more constant velocity portion of the cycle period which allows the outgoing beam 9 to bypass the scanning mirror 30 and serve as a pointer beam 27. The use of the "fringe" portion of the scanning beam as an aiming beam is efficient because during that portion of the cycle, the beam 9 is not as useful since it is not scanning (i.e., moving at a useful velocity).

For convenience of illustration, FIG. 5 illustrates the beam 9 as being angled slightly from a central axis in order that the beam 9 be shown in the figure. In fact, the beam 9 would properly shown as directly below the mirror 30 and the aiming beam 27 (see e.g. FIG. 3) within the module housing. FIG. 5 then illustrates how the beam 9 bypasses the scanning mirror 30 and reflects off of fixed mirror 50.

The various optical components, namely the laser diode 20, the focusing lens 22, the secondary focusing element 24 and the prism 26 are all illustrated as being mounted on a common chassis 60. This common mounting chassis 60 allows these components to be preconfigured or premanufactured thereby facilitating structural alignment. The chassis 60 itself is mounted on support brackets 62, 64. Preferably the brackets 62, 64 include respective shock mounts 63, 65 to minimize transfer of vibration between the housing 12 and the chassis 60. Other components in the scanner module 10 may also be mounted on a suitable chassis, including a chassis common to other components. The chassis 60 illustrated in FIG. 2 may also comprise a printed circuit board replacing and/or supplementing the other circuit boards 44, 45 illustrated.

Though the scanning mechanism illustrated in FIGS. 2–5 is particularly useful in a portable unit due to its compact configuration, such a scanning mechanism may be used in a larger handheld scanner or in a fixed scanner. The scanning mechanism illustrated in FIGS. 2–5 may be used alone to generate a one-dimensional scan pattern (i.e. a single scan line) or may be combined with a second scanning mechanism of like or different design to produce other scan patterns such as a two-dimensional asterisk pattern. The scanning mechanism illustrated in FIGS. 2–5 allows the scanning mirror 30 to pivot in one direction (to produce the single scan line), but the mechanism may be modified to pivot in two directions, vertically as well as horizontally to produce a two-dimensional (omnidirectional) pattern (e.g. a "+" pattern or an asterisk "*" pattern). One modification may comprise the provision of replaced bearings 40, 41 with a central bearing or a ball socket which permits omnidirectional pivoting of the frame member 32 relative to the fixed support 33. Two additional permanent magnets would be attached to the frame member 32 at the top and the bottom thereof and a pair of electro-magnets would be mounted to the fixed support 33 which would provide for motive force to pivot the mirror 30 in a direction at 90° to the direction pivoted by the first set of magnets 34–37. Suitable circuitry would alternately energize the respective electromagnets to tilt the mirror 30 in the desired direction at a given frequency to generate multiple scan lines.

The cable 5 is removably attachable to the scanner module 10 via a cable connector 7. The cable 10 provides electrical connection to the POS system for supplying electrical power to the scanner module 10 and provides a path for data transfer therebetween. Though this embodiment illustrates the scanner module 10 tethered to its terminal or "host", alternately a non-electrical connection may be implemented such as a infrared wireless or microwave transmission or radio frequency (RF) link. The RF could be narrowband or spread spectrum. In such a non-tethered system, the scanner module would require its own power source such as a battery. A recharging connection may be provided in the holder mechanism (for example holster 150 in the embodiment of FIG. 7 described below).

The scanner module 10 may be provided with programmability or configuration features such as internal or external switches for setting baud rate, signal tone/volume, or interface configuration (e.g. selecting between RS-232C or wand emulation interfaces). Alternately or in combination, the programmability or configuration may be accomplished by using selectable cables as disclosed in U.S. patent application Ser. No. 08/034,189 filed Mar. 22, 1993 U.S. Pat. No. 5,330,370 and/or may be accomplished by bar code scanning methods such as described in U.S. patent application Ser. No. 08/039,606 filed Mar. 25, 1993 U.S. Pat. No. 5,347,113, and U.S. Pat. Nos. 4,861,972 and 4,866,257, all four being herein incorporated by reference.

The scanner module 10 may be provided with a sensor 49 such as a magnetic coil element which activates (i.e. turns on) the scanner. The sensor 49 may comprise a proximity sensor device which would detect when the scanner module 10 is removed from its holster. Alternately, the sensor 49 may detect when the scanner module 10 is in proximity to an object to be scanned. The internal scanning mechanism is activated in response to a signal sent by the proximity sensor. Alternately, the sensor 49 may comprise a motion sensor device which responds to movement of the scanner module 10. When the scanner module 10 and aiming instrument are grasped and moved by the user, the motion sensor would detect the movement and activate the module. The scanning mechanism itself may provide a means for generating an actuation signal in response to motion of the module 10 (e.g. the motion of the module 10 may cause the scanning mechanism to move, generating a current which would indicate the module 10 has been moved and should be activated).

FIG. 5A is a block diagram of a scanner module configuration and method usable in the scanner of FIGS. 1–5. The steps of the method of this system may include:

generating a laser beam 9 with a laser diode 20;

focusing the laser beam with laser optics 22 to generate an outgoing beam;

scanning the outgoing beam with a scanning mechanism such as the oscillating mirror 30 previously described, a rotating optical polygon, a piezoelectric mirror element, or a holographic disk;

passing the scanned beam 25 through the window 16;

scanning the beam 25 across the bar code 3; sending return light R which has reflected and/or scattered back through the window 16 retrodirectively off the scanning mechanism 30;

collecting the return light with collection optics 40;

focusing the collected return light onto the detector 42 and detecting a signal;

amplifying the detected signal in amplifier 48 and sending the amplified signal to the host via a communication link such as cable 5.

FIG. 5A also illustrates a location for the sensor 49 (such as a proximity sensor or motion sensor) which may provide the step of detecting when the scanner module is removed from its holster or alternately, detecting when the scanner is in motion or in proximity to an object to be scanned. The scanner is turned on in response to the sensor.

The previous embodiments described a retrodirective system for the return light which has reflected and/or scattered off the bar code passes off the scanning mirror for collection. FIG. 6 illustrates an alternate embodiment for a scanner module 110 having a housing 112 with three windows 120, 122, 124. A scanner module 110 is attachable to a pointing instrument 102 via clip 118. A connector cable 105 including a plug connector 107 provides communication to the data terminal (not shown). The outgoing beam passes through the first window 120 and return light scanner window reflected off the bar code passes through the other windows 122, 124 where it is collected such as by a toroidal collection lens or by a concave collection mirror onto a suitable detector. This embodiment is a non-retrodirective or direct collection system meaning the return or collected light does not pass through the scanning mechanism on its way to the detector.

FIG. 6A is a block diagram of the configuration of non-retrodirective scanner module usable in the scanner of FIG. 6. The steps of the scanning method of the system may include:

generating a laser beam with a laser diode 130;

focusing the laser beam with laser optics 132 to generate an outgoing beam;

scanning the outgoing beam with a scanning mechanism 134 to produce a scanning beam;

passing the scanned beam through the window 120;

scanning the beam across the bar code;

allowing return light which has reflected and/or scattered back through the return window or windows 122, 124 non-retrodirectively bypassing the scanning mechanism 134;

collecting the return light with collection optics 136;

focusing the collected return light onto the detector 138 and detecting a signal;

amplifying the detected signal in amplifier 140 and sending the amplified signal to the host over cable 105.

Figure 9:
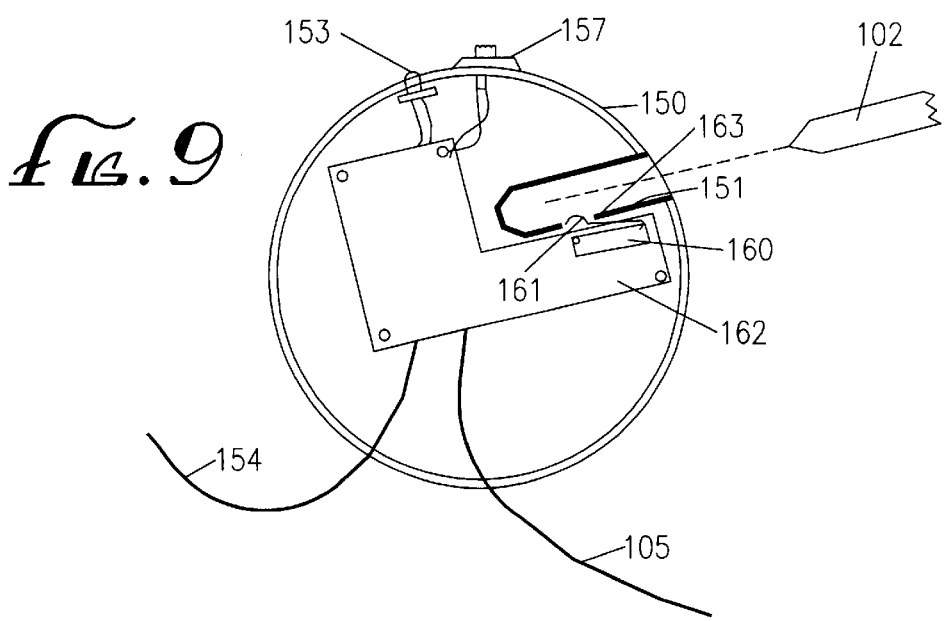
FIG. 9 diagrammatically illustrates internals of the holder module.
Figure 7A:
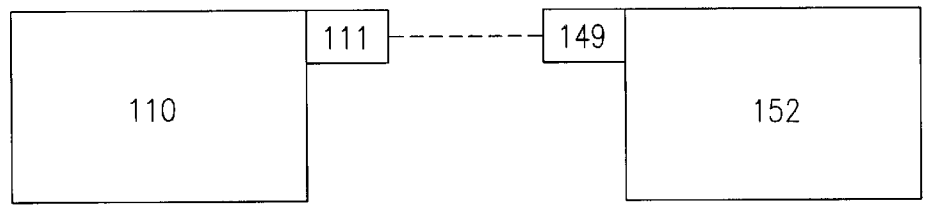
FIG. 7A is a block diagram of a wireless communication embodiment for a scanner module and terminal system.
Figure 8:
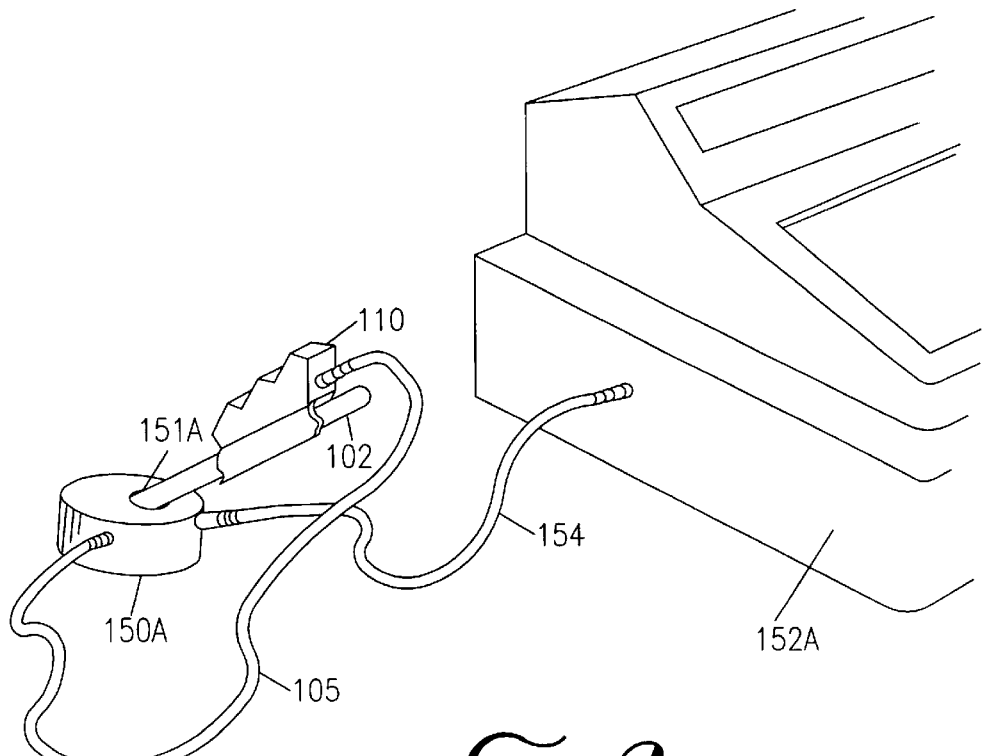
FIG. 8 illustrates an alternate scanner module and data terminal module system with the scanner module holder remotely located from the terminal module.

The pointing instrument mountable scanner 10 or 110 is also combinable with an integrated data terminal as shown in FIGS. 7–9. In FIG. 7, the scanner module 110 is mounted on a pen 102 which may be used with the pen-base data terminal 152. The scanner module 110 is connected by a cable 105 to a holder module or stand 150. The pen or stylus 102 is held in the holster 151 in the stand 150. A cable 154 connects the decoding circuits in the stand 150 to the data terminal or POS station 152. A switch 157 may be provided on the holder module 150. Activation of the switch 157 may allow the scanner module 110 to read continually or to be on for a given fixed time such as several seconds. The display light 107 and the scanner module 110 may be used to indicate power on or a successful read. A successful read may also be indicated by an audible tone. The holder module 150 may include an indicator light 153 which may indicate activation.

FIG. 8 illustrates another alternate integrated data terminal and scanner system to that of FIG. 7. The only difference is that the 150A is located remotely from the data terminal 152A. The holder module 150 in FIG. 7 may be permanently affixed or mounted to the data terminal 152, may be integrally constructed, or may be removable by a suitable mechanical connector to allow the holder module 150 to be positioned such as shown in the configuration of FIG. 8. The pointing instrument 102 is placeable in a port 151A in the separately supported holder module 150A remotely from the data terminal module 152A. A cable 154 connects the holder module 150A and the data terminal 152A. A second cable 105 provides connection between the scanner module 110 and the holder module 150A. Alternately, the scanner module may be connected by a cable or some other signal transmission mechanism (such as wireless RF, infrared or microwave transmission) either directly to the data terminal module 152A or through the holder module 150A.

The holder module 150A itself be modified be removable mounted to the data terminal module 152A. The mounting mechanism may comprise hook and loop material (such as sold under the trademark Velcro™). Such an attachment may also permit the orientation of the holder module 150A to be adjusted by the user in order to place the pointing instrument 102 and holder module 150A in a desired orientation relative to the data terminal module 152A. Alternately, the holder module 150A may be mounted (either removably or otherwise) by a suitable means to a convenient surface.

FIG. 9 illustrates one possible configuration for the inside of the holder module 150. The holder module 150 includes a body with a holster 151 for receiving the aiming instrument 102. The holder module 150 includes a printed circuit board 162 containing the decoding electronics for decoding incoming signal from the scanner module 110 over the connector cable 105. A microswitch 160 is mounted on the circuit board having an activating arm 161 extending through a hole 163 in the side of the stylus holster 151. The switch 160/161 is actuated by the action of the aiming instrument 102 being inserted and/or removed from the holster 151. When the stylus 102 (shown graphically) is removed from the holder 151, the switch 160 activates the label reading and scanning circuitry in the scanning module 110 and the decoding electronics in the printed circuit board 162. The stylus holster 150 with the switch 160 thereby provides the method of automatic activation of the scanner module 110. Cable 154 is connected to the data terminal at point-of-sale station providing communication and power. A display light 153 actively connected to the circuit board 162 may be used to indicate a power on condition or a successful read. The external switch 157 may be used to manually activate the scanning operation as previously described.

The scanning module 110 may be tethered to the terminal or host 152 via a connector cable 105 or may alternately comprise a non-tethered wireless communication link such as diagrammatically shown in FIG. 7A. In FIG. 7A, the scanning module 110 is connected to a first communication module 111 which communicates with a second communication module 149 connected to the terminal or host 152. Communication may be via infrared wireless, microwave transmission, radio frequency (RF) link, or the like. The communication module 111 may comprise a separate unit or may be integrally incorporated into the scanning module 110. Similarly, the communication module 149 may comprise a separate unit or may be incorporated into the terminal 152.

Figure 12:
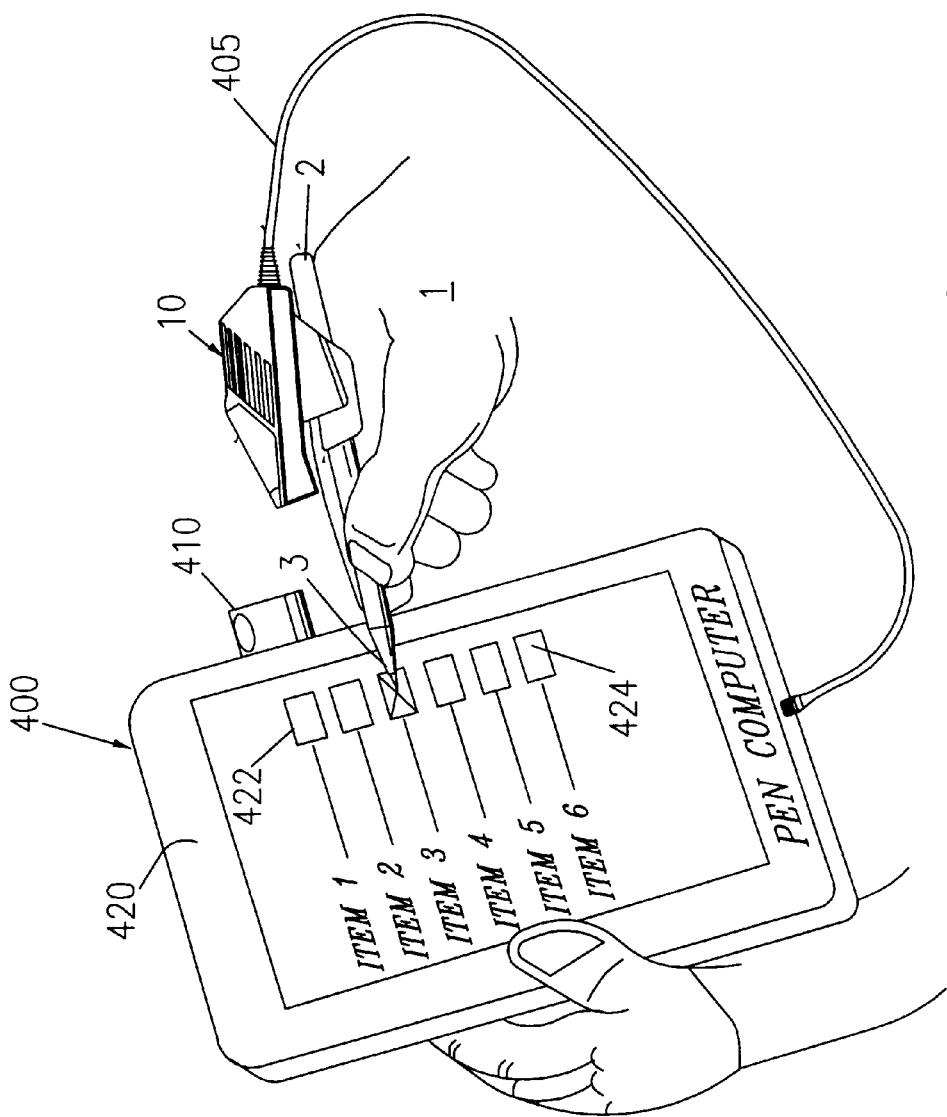
FIG. 12 illustrates a pen-based computer and scanner module combination.

As described above, the aiming instrument (element 2 or 102) may be a conventional writing utensil, such as a pen or pencil, a stylus for use in a pen-based data entry system, or a light-pen including a lighted tip (element 3 in FIG. 1) for use in a data entry system requiring a light pen. The scanner module 10 is lightweight so as not to interfere with conventional writing operations or data entry in a data terminal. In a preferred embodiment, the data terminal module is a portable unit which is handheld and/or easily carried on a shoulder strap or belt hook by the user. Such a data terminal or pen-based computer module combination is shown as a handheld pen-based module 400 in FIG. 12. When a bar code is to be scanned, the user takes the aiming instrument 2 in his/her hand 1 and merely points the aiming instrument 2 in the vicinity of the bar code. If the system includes an aiming light, the user may use the aiming light to further guide the scanning beam to read the bar code. The actual aim of the aiming beam may be parallel with the aiming instrument, designed to intersect at a given distance from the tip 3 of the aiming instrument, or as shown in the figures, aimed slightly above the precise aim of the aiming instrument. When data needs to be entered, the instrument 2 functions as a stylus (i.e the tip 3) which may be used for inputting data or making selections of particular menu items 422, 424 on a user-friendly menu 420 in the pen-based computer 400. The user need not switch hands at any time. The preferred precision hand is always the one holding the scanner and is always the one to actuate or effect data entry into the portable data terminal or pen-based computer module 400. The off hand may be used to hold the portable data terminal and the precision hand moves conveniently and efficiently from pointing at a bar code for scanning to making data entry, configuration, or some other option, such as manipulating a user-friendly menu 420 control as shown in FIG. 12. The pen-based computer 400 may comprise a handheld unit as shown in FIG. 12 or may alternately comprise a fixed (e.g. checkstand mounted) or alternately a portable unit such as a wrist-mounted configuration.

The terminal or handheld unit may comprise a pen-based (light actuation) input device or any other suitable design such as a touch pad sensor which is actuated by the pen. In certain applications, the pointing instrument may comprise a pen or pencil. In other applications the pointing instrument may comprise a pen-based computer stylus for use with an integrated data terminal module operably connected to the scanner module or alternately a light pen for operating a light actuable display screen of a data terminal module.

The scanner module 10 and pointing instrument 2 may be secured in a holster 410 mounted on the side of the pen-based computer 400 when not in use. The scanner module 10 may be connected to the pen-based computer 400 by a connector cable 405, which provides connection for communication and/or power. Alternately, the scanner module 10 may be battery-powered and linked by a non-tethered communication path such as an RF link as described in other embodiments herein.

When the scanner module 10 is connected by a cable 405, the module is prevented from being lost or separated (or stolen) from the pen based computer 400. When the scanner module 10 is equipped with a wireless RF link, it may be merely tethered by a cord to prevent separation, loss, or theft. In the non-tethered, wireless embodiments (such as the RF link) it is still desirable to prevent the scanner module 10 from becoming separated from the host or pen-based computer 400. To prevent such separation, the system may include an electronic means comprising a separation alarm or "wireless handcuff". With the scanner module 10 transmitting to the host terminal (such as the pen-based computer 400), separation or theft may be averted by having the host terminal constantly (or intermittently) poll the scanner module 10 to confirm that the scanner module is still "there". If the separation between the scanner module 10 and the host becomes too great (exceeds a given distance, e.g. about two meters), the scanner module 10 and/or the host will sound a signal indicating that the scanner module 10 is too far away from its host. A signal may also be employed to alert the user that the scanner module is approaching being "out of range". Details of a preferred "wireless handcuff" system are described below with respect to FIGS. 13–14.

Figure 10:
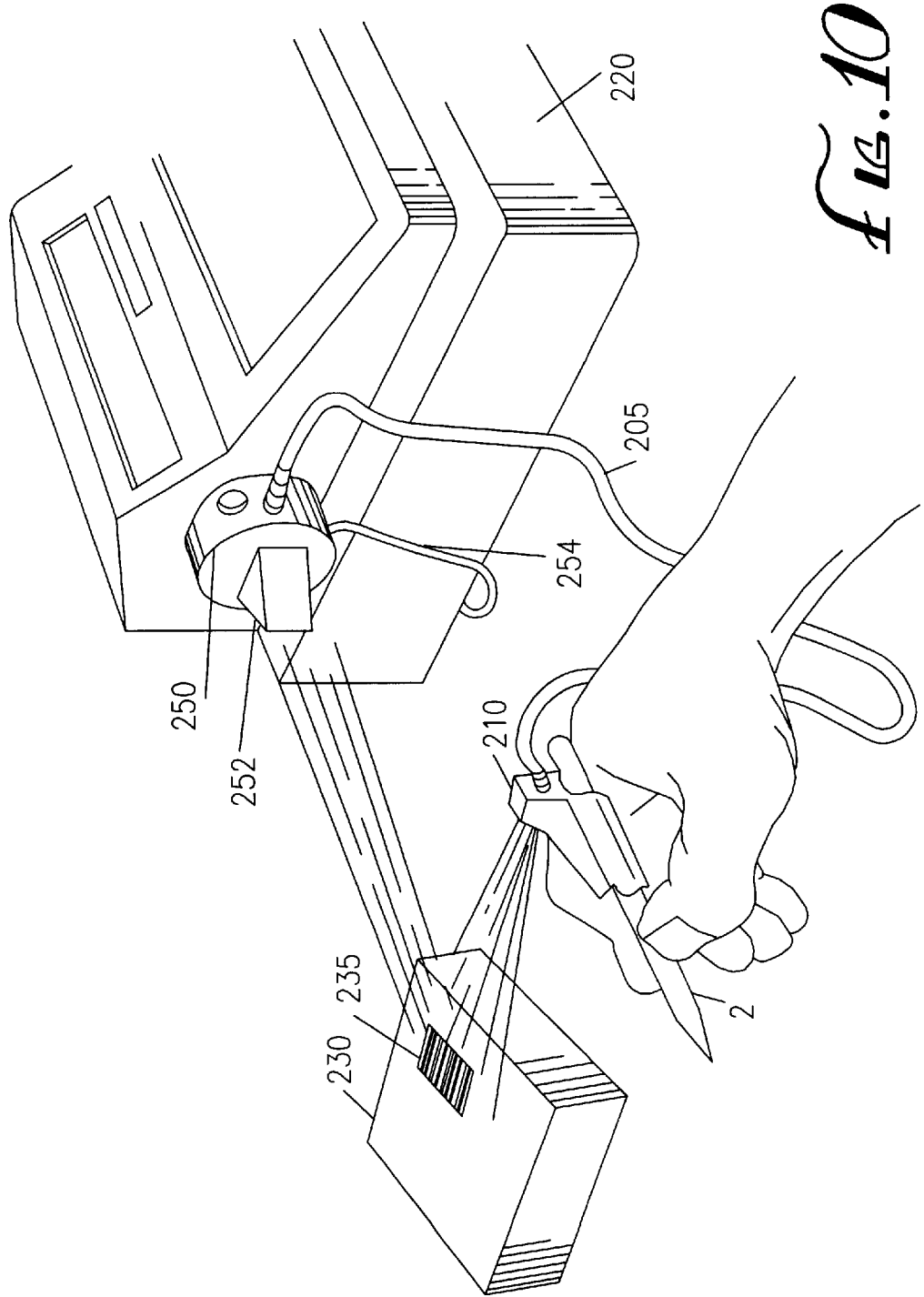
FIG. 10 illustrates another alternate scanner module and data terminal module system where the detector is located at the data terminal.

FIG. 10 illustrates yet another alternate scanner module and data terminal module system where the detector is located in the data terminal module. The data terminal module 220 includes a holster module 250. The scanner module 210 generates an outgoing scan beam which is aimed toward a bar code 235 on an object 230 to be scanned. Return light reflecting and/or scattering off the bar code 235 is detected by a collection system and detector 252 located at the holster module 250 in a non-retrodirective system. Since collection optics and other hardware is not required to be housed in the scanner module 210, further compactness or economies may possibly be achieved. Alternately, the scanner module 210 may also be equipped with collection optics providing for collection to be performed in both locations which may result in improved scan success rate.

The operation of this embodiment may be further explained by reference to FIG. 10A. The laser diode 221 and laser optics 222 project a beam of laser light through the scanning mechanism 223 to the bar code label 235. Some of the reflected light from the label is collected by the detection optics 231 in the holder module 250. The signal from the detector 232 is amplified and decoded in processor/interface 233 with the final data being sent to the data terminal module/POS station via cable 254. Controller 234 controls the operation of the scanner module 210 turning on the scanner either continuously, for a fixed time, or to allow removal of the aiming instrument from the holder to initiate switch function.

Figure 10A:
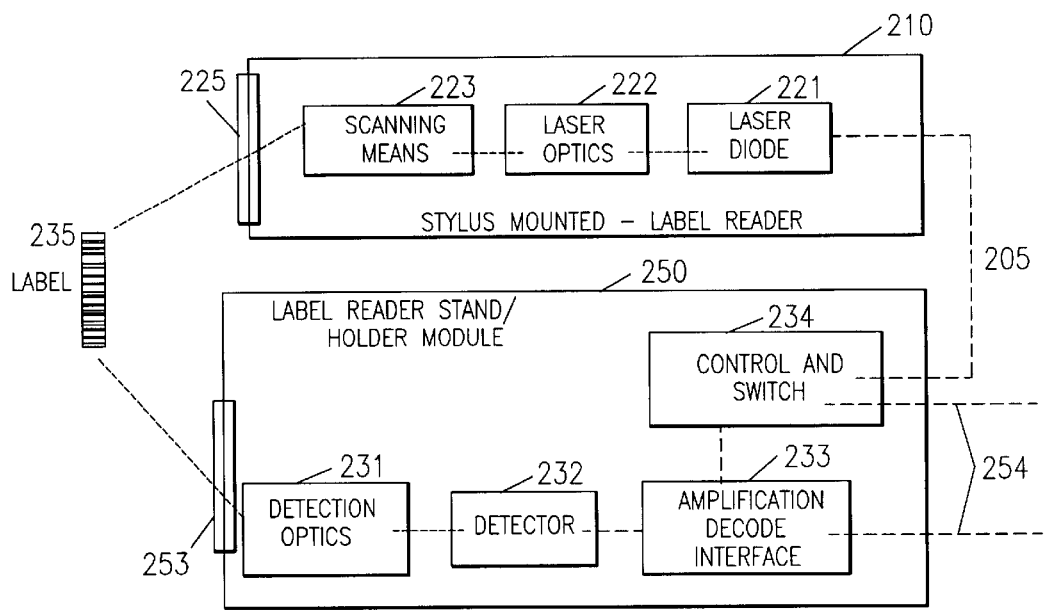
FIG. 10A is a block diagram illustrating a scanning configuration of the system of FIG. 10.

FIG. 10A is a block diagram of a scanner module configuration and method usable in the scanner of FIG. 10. The steps of the method of this system may include:

generating a laser beam with a laser diode 221;

focusing the laser beam with laser optics 222 to generate an outgoing beam;

scanning the outgoing beam with a scanning mechanism 223;

passing the scanned beam through the window 225;

scanning the beam across the bar code 335;

allowing return light which has reflected and/or scattered back through the window 253 in the stand module 250;

collecting the return light with collection optics 231;

focusing the collected return light onto the detector 232 and detecting a signal;

amplifying the detected signal in amplifier 233 and sending the amplified signal to the host over cable 254 to the host;

controlling the activation of the scanning module 210 with a controller 234 over connection cable 205.

Figure 11:
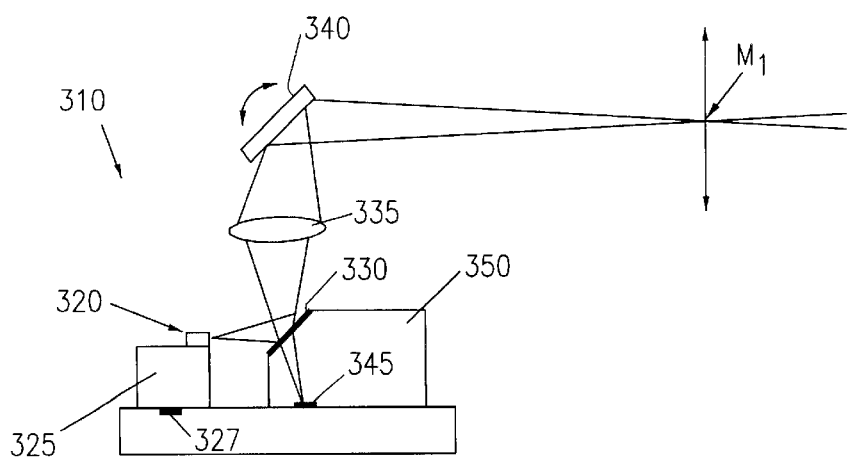
FIG. 11 is diagrammatic drawing for a design of an alternate compact scanner module.

Another alternate embodiment is to have the scanning module mounted in the aiming instrument as shown in FIG. 11. The compact scanner module 310 includes a laser diode source 320 mounted on a semiconductor pedestal 325, a prism 330, an ASIC 350 (which includes a photodetector 345, current-to-voltage conversion and signal processing circuitry, and laser diode circuitry), a focusing lens 335, and a scanning mechanism 340. The laser light beam from the diode source 320 diverges from the diode source 320 and reflects off a semi-reflecting surface of the prism 330 which is also attached to the semiconductor chip 350. The outgoing beam is reflected off the prism 330 and is focused by focusing element illustrated as lens 335 which focuses the outgoing beam to a given spot size at a given distance (shown as $M_1$). The focusing beam is then scanned by a scanning mechanism shown as an oscillating mirror 340. Alternately, the scanning mechanism may comprise a rotating prism assembly, by changing the prism orientation the angle of scanning will change to provide the desired scan pattern. Other suitable type scanning mechanism may be employed such as a mirror constructed of or mounted on a material which deflects upon application of a voltage thereby scanning the beam. One such material may comprise a piezoelectric bimorphic construction. Such a design may achieve desired low power consumption and compactness.

Light scattering and/or reflecting from the bar code passes through the scanning mechanism 340 through the lens 335 passes through the surface of the prism 330 and is focused onto the photodetector 345. The ASIC 350 may also include the signal processing circuitry for converting detected light signals into a digitized bit stream which can be decoded.

Alternately, the ASIC 350 may also include integrated decoding and interface electronics. The driver circuitry 327 may include modulating electronics and the processing demodulating electronics so as to include mechanism for isolating the detected signal from ambient light. The lens system (shown as lens element 335) may also include a focusing mechanism such as previously described. This integrated diode source, scan mechanism and associated electronics configuration advantageously achieves very compact size for a scanning module.

Another alternate embodiment of the electronics required for a laser diode coupler based optical scanning system is shown in FIG. 16. In this system, the linear ASIC 449 is the ASIC substrate at the base of the laser diode coupler. Within that ASIC 449 is the visible laser diode driver electronics 452, the scanning mechanism oscillator driver 453 which switches the scanning mechanism (also known as the "dither" device) to move back and forth, the actual driver signal generator 454 for the scan mechanism ("dither") coil 460, the liquid crystal shutter driver 455 for an variable aperture liquid crystal shutter 456 (with functions as described in U.S. patent application Ser. No. 07/992,932 filed Dec. 18, 1992 U.S. Pat. No. 5,347,121 and U.S. patent application Ser. No. 08/164,300 filed Dec. 7, 1993 U.S. Pat. No. 5,479,011), and a signal processor 451 for converting the detected signals from the ASIC photodetector into electrical signals suitable for passing on to the bar code scanner decoding electronics attached to the coupler. A low pass filter 452, which may be part of the signal processor, allows for low frequency light signals such as those from extraneous ambient light sources (such as sunlight or overhead fluorescent lamps) to be filtered out of the signal to be passed on to the bar code scanner.

The integrated unit that includes the laser diode chip 320, the semiconductor pedestal 325, the prism 330, and the ASIC 350 may be constructed by a suitable chip manufacturer such as Sony Corporation. Such a scanner module 310 may be constructed in a compact fashion so as to enable the scanner module to be mounted inside the aiming instrument 2 avoiding the need for the bulkier clip-on module 10 mounted to the outside of the instrument.

In another embodiment, the system may comprise a fiber optic cable coupling light collected in the aiming instrument to connect it to a detector subsystem with signal processing and further electronic processing, including a decoding beam implemented in the portable data terminal. The collection and scanning configuration illustrated in FIG. 11 is merely a preferred configuration.

Figure 15A:
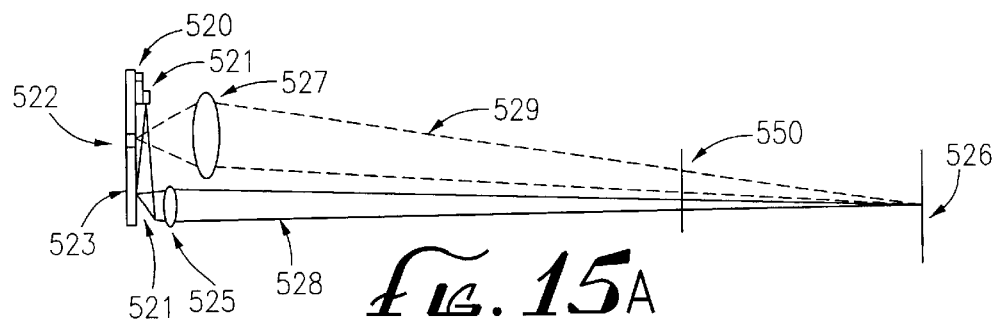
FIGS. 15a–e illustrate a series of potential optical subsystems for focussing the light from the laser diode coupler and collecting the light scattered from the bar code plane.

Additional optical subsystems using the laser diode coupler subsystem are shown in FIGS. 15a through 15e. In FIG. 15a, the laser diode coupler ASIC 523 has the diode source 521 mounted on a semiconductor pedestal 520. Light emitted from the laser diode source 521 passes to a mirror 524, which bends the beam to hit focussing lens 525. The focussing beam 528 passes to a scanning element plane 550, shown only schematically in each of these figures The scanning element plane 550 is the location where the scan mechanism, such as for example element 340 shown in FIG. 11, is positioned as to each of the designs of FIGS. 15a–e. The focussed beam hits the bar code plane 526 where it is scanned to produce at least one scan line. Scattered light 529 from the bar code bounces back off the scanning element at the scan plane 550, and hits collection lens 527. The collection lens 527 in turn focusses the light on photodetector 522 within the laser diode coupler ASIC.

Figure 15B:
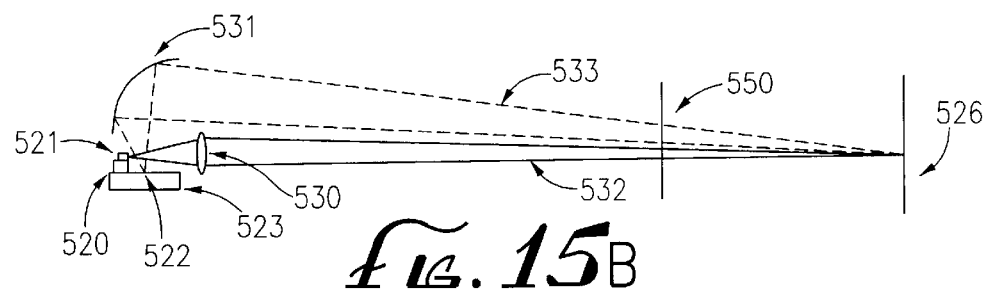

In the embodiment of FIG. 15b, the laser diode source 521 is allowed to exit directly (i.e. straight) to focussing lens 530, and the resulting focussing light beam 532 is bounced off scanning element plane 550 for scanning onto the bar code plane 526 where the beam is scanned by the scanning mechanism. Return light 533 scattered and/or reflected from the bar code plane 526 bounces back off the scanning element plane 550 and is collected by curved mirror 531 to focus on photodetector 522 within the laser diode coupler ASIC 523. This mirror may be spherical or aspheric in some way, depending on the geometric needs of the optical design.

Figure 15C:
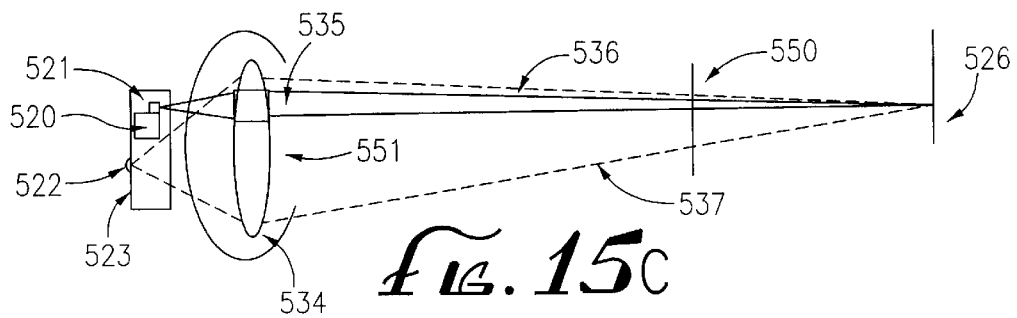

In the embodiment of FIG. 15c, the laser diode source 521 emits light which hits a central lens element 535 in a bifocal lens assembly 551. The focussing light beam 536 produced then passes to bounce off the scanning element plane 550 and focusses on the bar code 526. The scattered light 537 passes off the scanning element plane 550 and is focussed by the large outer element 534 of bifocal lens 551. This large outer element 534 focusses the light on photodetector 522 included in the laser diode coupler ASIC 522. The central lens element 535 may be concentrically positioned within the bifocal lens 552 or offset as shown in FIG. 15c.

Figure 15D:
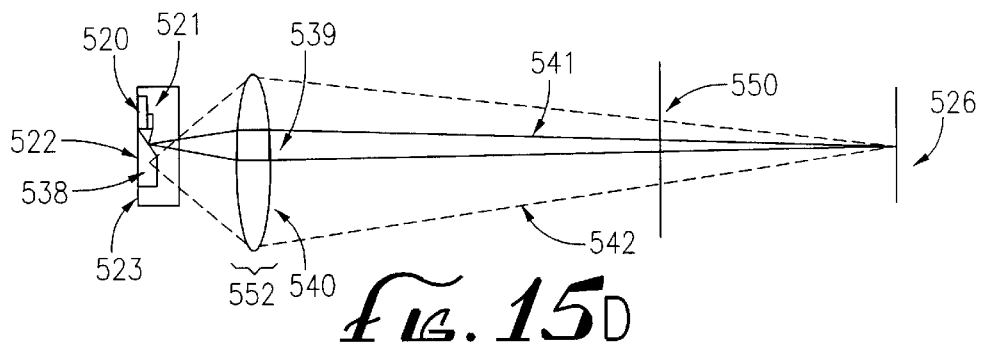

In the embodiment of FIG. 15d, the laser diode source 521 emits light which reflects from micro-prism 522 and passes through the central focussing element 539 of bifocal lens 552. The focusses light beam 541 bounces off the scanning plane 550 and is focussed onto the bar code 526. The scattered light 541 from the bar code bounces off the scan plane 550 and is focussed by the outer element 540 of the bifocal lens 552. This light is in turn focussed on photodetector 522 in the laser diode coupler ASIC 523.

Figure 15E:
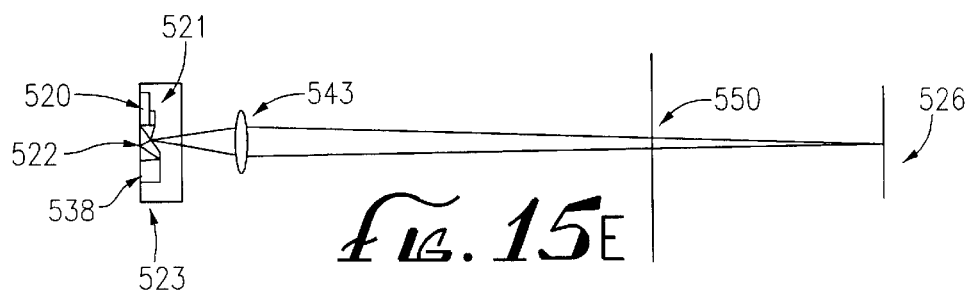

In FIG. 15e, the light emitted from the laser diode 521 is reflected from a surface of the micro-prism 538. This light is directed onto lens 543, which focuses the beam after reflection off scanning plane 550 on the bar code plane 526. Scattered light from the bar code bounces off the scanning plane 550 and is refocused by the same lens 543. This return light passes through the surface of the micro-prism 538 and is focused on the photodetector 522 in the laser diode coupler ASIC 523.

These previously-described optical implementations are example means of implementing this compact optical system. Other suitable configurations, such as disclosed in U.S. Pat. No. 5,202,784 may be implemented, herein incorporated by reference.

Figure 17:
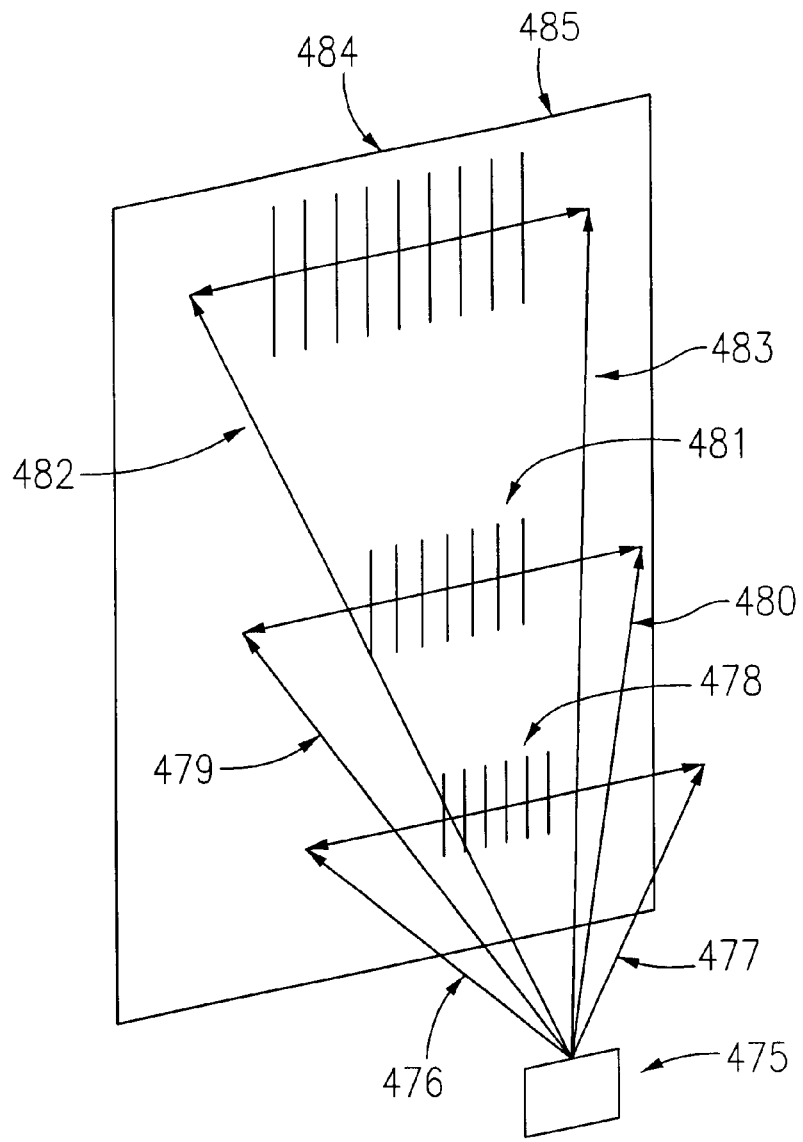
FIG. 17 shows a means of scanning multiple bar codes with a single complex scan pattern from a single two-dimensional scanning element.

The scan mechanism referred to previously may be capable of creating patterns other than a conventional single-line scan pattern. As shown in FIG. 17, in applications such as package tracking, often multiple bar codes 478, 481, and 484 are applied to a single label 485 in a predetermined relationship to each other. A single scan mechanism 475, if capable of being driven in two dimensions, can scan a line first from the arc spanned between beginning laser beam light ray 476 to end ray 477 to cross a first bar code 478, then from beginning ray 480 to end ray 479 to cross a second bar code 481, and then from beginning ray 482 to end ray 483 to cross a third bar code 484. This scan mechanism may be then incorporated in the compact scan modules 10 described earlier. This system can be versatile enough to cover automatic scanning of any predetermined set of bar codes pasted on a single surface, without the user having to move the scanner after positioning to read the first of the predetermined set of labels.

Figure 18A:
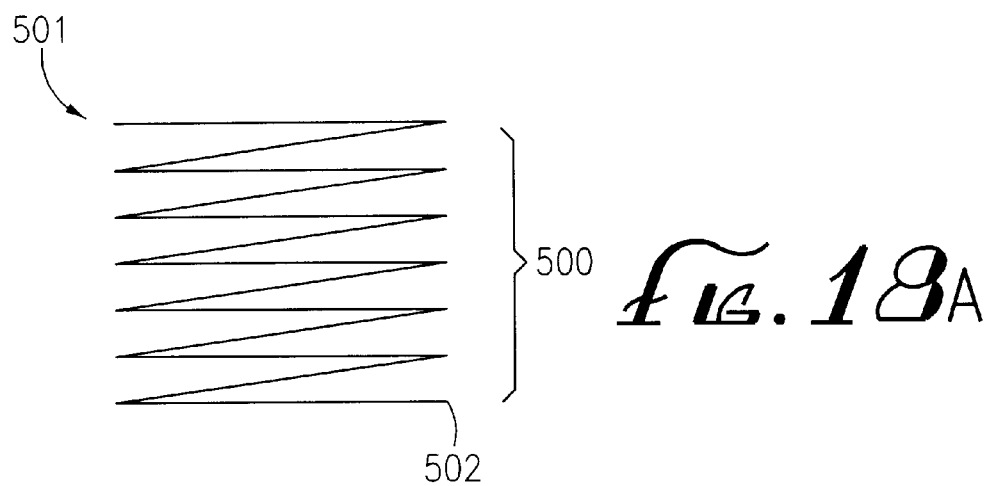
FIGS. 18a–c illustrate three different scan patterns which may be generated by the scanning element used in the compact scanners described herein.
Figure 18B:
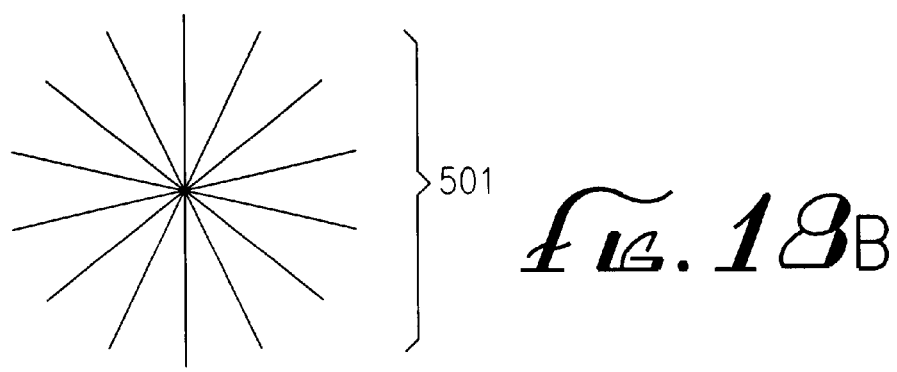
Figure 18C:
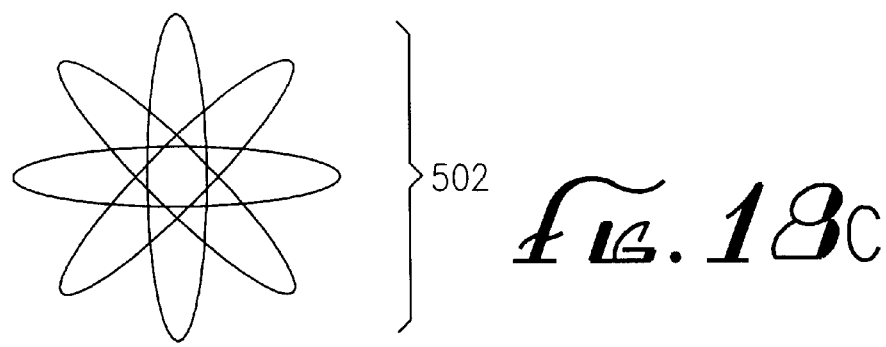

In addition to reading multiple labels simultaneously, the scan mechanism may also be configured to generate complex scan patterns such as shown in FIGS. 18a–c. The pattern shown in FIG. 18a starts at point 501 and "rasters" back and forth before it ends up tracing the full pattern 500 to end at point 502. A second pattern 18b is an "asterisk" pattern 501, with all lines crossing at a given point on the two-dimensional scan array. The signal pattern 502 shown in FIG. 18c is a more complex array. All these patterns can be generated by a single scan mechanism capable of tracing two-dimensional patterns, or a set of single line scan mechanisms scanning in sequence (one scanning across the scan mechanism of the second element).

As described above, the compactness of the scanner modules create potential difficulties in the scanner module being separated from its host and being lost, stolen, or out of range so as to lose function. To address this potential difficulty, the "wireless handcuffs" or "out of range" system previously discussed will now be described with respect to FIGS. 13–14.

The "wireless handcuffs" may have several purposes including:

(1) Warning the scanner user that he/she has moved "out of range" of proper reception by the host terminal;

(2) Warning someone at the terminal location that someone has taken the remote scanner from the location without authorization; and (3) Preventing the device from becoming separated from the host where it can be lost or misplaced.

Figure 13:
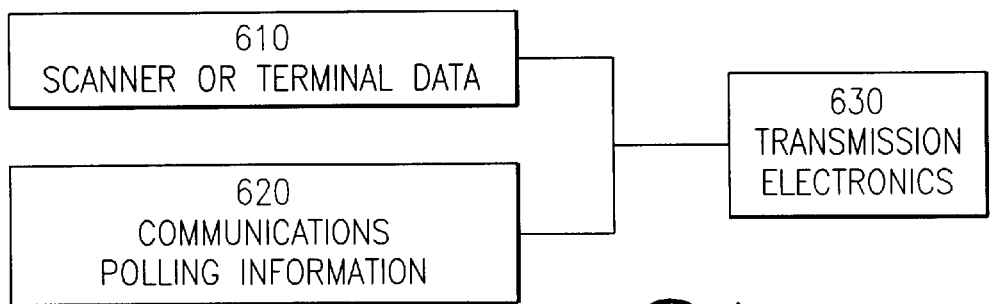
FIG. 13 is a block diagram illustrating an "out of range" system for a scanner module.
Figure 14:
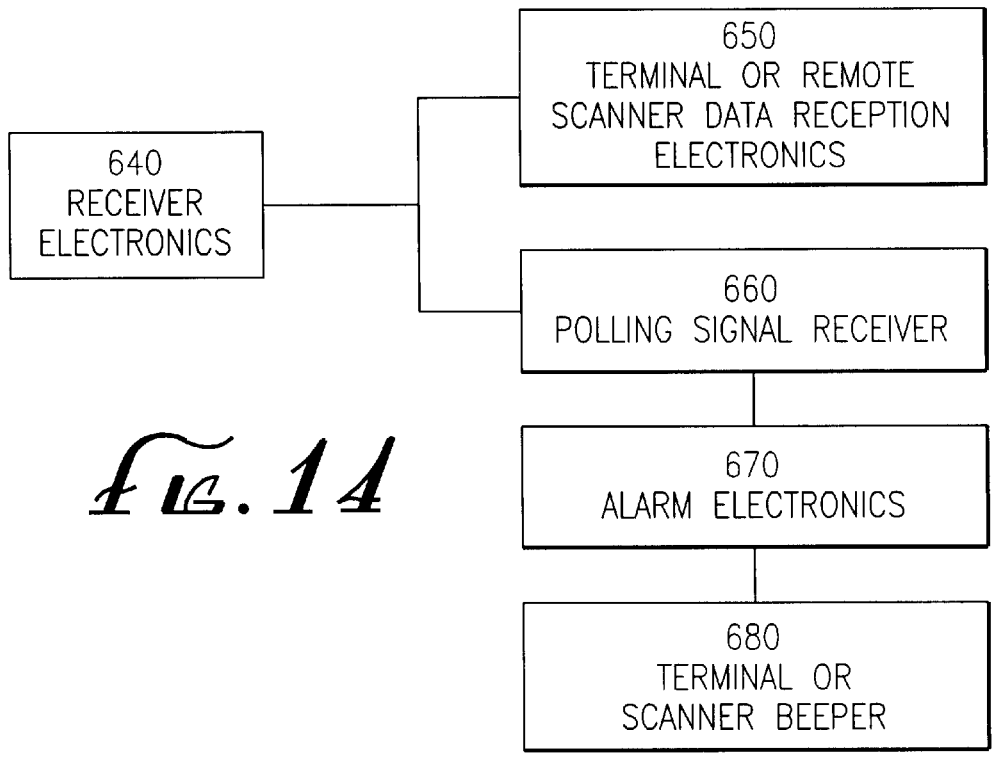
FIG. 14 is a block diagram illustrating an alternate "out of range" system for a scanner module.

When the handheld device is taken "out of range" of the host, an alarm, perhaps in the form of an insistent series of beeps on one or both ends of the system (the host terminal and the handheld device) will sound off. One way this could work is shown in FIGS. 13 and 14 below. On the transmission end (shown in FIG. 13), either the scanner or terminal 610 would prepare data for transmission to the host. This "scanner or terminal data" might include scanned bar code data that had been decoded (from the scanner) or information (from the terminal) telling the scanner that data had been successfully read. This data would be mixed with "Communications Polling Information" 620, a specialized signal bit stream whose sole purpose is for one device to tell the other device that the first device is "on" and transmitting. This communications poll 620 is continually being transmitted on a regular basis, regardless of whether or not other data is being transmitted. After the polling signals are mixed with the "real" data, the transmission electronics 630 in the unit converts it into a signal which can be broadcast by antenna or infrared link. Data and signal may be transmitted by any suitable wireless link, such as RF or infrared. The data terminal may be a handheld unit, a fixed unit, or a conventional point of sale (POS) system.

Alternately, an electronics mixer may be provided for combining regular data with the polling information. A flow chart of the reception end handcuff method, the situation is very similar and is shown in FIG. 14. The receiver electronics 640 for the data splits the combined "real data" and "polling data" into two buckets. The first set of data is passed on for processing within the scanner or terminal 650—just as any set of data would be handled. The "polling data" is sent to a polling signal receiver 660. Provided that the polling signal receiver 660 "hears" data transmitted from the other party within predetermined time increments, the receiver 560makes a decision that "all is well" and does not send out an alarm request. If the receiver 660 does not "hear" the necessary polling data within those predetermined time increments, then it sends an alarm signal to a separate set of electronics 670 within the terminal or remote scanner. This alarm electronics subsystem 670 in turn drives a beeper 680 which will indicate to the user that the unit is beyond an acceptable transmission range for the device. The alarm may be programmed to turn off automatically after a minute or so of transmission if desired, or allowed to continue to operate. The alarm may also be set so it automatically turns off when the polling signal is received again.

It should also be noted that all of the above scanning modules may also be used to scan across information other than bar codes and still capture the light scattered from them for use in other kinds of automatic data capture devices. This scanning function may include picture scanning for use in the graphic arts and facsimile industries, as well as scanning of conventional OCR (optical character recognition) characters as well. Further, the scan modules described herein may be used to read several different types of data within the same unit, allowing multiple functionality for reading bar codes, OCR data, and even complex graphics for decoding and/or recognition within the scanning subsystem or host computers connected to the scanning subsystems. The descriptions above are therefore not intended to be limiting in any way, but instead to show the full potential of this concept in many applications.

Thus scanning module and method has been shown and described. Though certain examples and advantages have been disclosed, further advantages and modifications may become obvious to one skilled in the art from the disclosures herein. The invention therefore is not to be limited except in the spirit of the claims that follow.

What is claimed is:

1. A data reading system comprising
   a pointing instrument which may be held in a hand of an operator;
   a scanner module mounted to the pointing instrument, the scanner module comprising a beam source, a focusing lens for focusing the beam to a desired waist location, a scanning mirror for scanning the focused beam along at least one axis to produce a scanning beam of at least one scan line, and a detector for detecting light reflected and/or scattered off the object being scanned,
   wherein the pointing instrument affects aiming of the scanning beam toward an object to be scanned by pointing the pointing instrument at the object.

2. A data system according to claim 1 further comprising a data terminal module operably connected to the scanner module.

3. A data system according to claim 2 further comprising a connection cable between the scanner module and the data terminal module.

4. A data reading system according to claim 2 wherein the data terminal module comprises a pen-based computing system and the pointing instrument comprises a stylus for operating the pen-based computer system.

5. A data reading system according to claim 2 wherein the pointing instrument is usable to actuate the data terminal module.

6. A data reading system according to claim 2 wherein data terminal module comprises a light actuable display screen and the pointing instrument comprises a light pen for operating the data terminal module.

7. A data reading system according to claim 1 wherein the scanner module is releasable and may be removed from the pointing instrument.

8. A data reading system according to claim 2 wherein the scanner module is operably connected to the data terminal module by a wireless link.

9. A data reading system according to claim 8 further comprising an electronic means for preventing separation of the scanner module from the data terminal, the electronic means sounding a signal when the scanner module becomes separated from the data terminal by a distance exceeding a given amount.

10. A data reading system for scanning an object to be read, comprising
    a light source for producing a reading beam;
    a focusing system for focusing the reading beam to a desired waist location;
    a scanning mechanism for scanning the focused beam along at least one axis to produce a scanning beam of at least one scan line; and a detector for detecting light reflected and/or scattered off the object being scanned, wherein the scanning mechanism comprises
   a fixed member,
   a frame member pivotally mounted to the fixed member,
   a scanning mirror mounted on the frame member, the frame member being pivotally mounted on bearings to allow the frame member to pivot about a pivoting axis a few degrees in at least two opposite directions,
   first and second permanent magnets positioned on the frame member on opposite sides of the pivoting axis,
   a first electro-magnet mounted to the fixed member proximate the first permanent magnet and a second electromagnet mounted to the fixed member proximate the second permanent magnet, wherein the first permanent magnet is respectively attracted or repelled to the respective first electromagnets as a flow of current applied to the electromagnet is allowed to alternate at a desired frequency.

11. A data reading system according to claim 10, wherein the current is applied at a resonant frequency of the scanning mechanism.

12. A data reading system according to claim 10 further comprising a spring for biasing the frame member to a given position.

13. A data reading system according to claim 10 further comprising a fixed mirror mounted to the fixed support behind the scanning mirror, wherein the scanning mirror has a width such that the reading beam bypasses the scanning mirror on at least one side of the scanning mirror as it pivots, the reading beam reflecting off the fixed mirror and being directed out along a same direction as the scanning beam to intermittently provide an aiming beam to assist a user in directing the scanning beam.

14. A data reading system comprising
   a pointing instrument which may be held in a hand of an operator;
   a scanner module mounted within the pointing instrument, the scanner module comprising a semiconductor chip, a laser diode mounted on the semiconductor chip producing a laser beam, a focusing lens for focusing the laser beam, a scanning mechanism for scanning the laser beam to produce at least one scan line, and an ASIC on the semiconductor chip containing (a) a photodetector for detecting return light reflecting off a target and producing an electrical signal corresponding thereto and (b) signal conversion and signal processing circuitry for converting and processing the signal.

15. A data reading system according to claim 14 wherein the scanning mechanism comprises a mirror constructed of piezoelectric bimorphic material.

16. A data reading system according to claim 14 wherein the scanning mechanism comprises a micro-prism.

17. A data reading system comprising
   a scanner which may be held in a hand of an operator;
   a host operably connected to the scanner via a wireless link;
   an electronic means for preventing separation of the scanner from the host, the electronic means sounding a signal when the scanner becomes separated from the host by a distance exceeding a given amount.

18. A data reading system according to claim 17 wherein the signal is sounded from the scanner.

19. A data reading system according to claim 17 wherein the signal is sounded from the host.

20. A data reading system according to claim 17 wherein the host comprises a data terminal.

21. A data reading system according to claim 17 wherein the electronic means comprises (a) a polling transmitter located in the scanner, (b) a receiver located in the host, the polling transmitter periodically sending a polling signal to the receiver, and (c) means for sounding the signal if the receiver does not detect the polling signal within a predetermined time increment.

22. A method of data reading, comprising the steps of
   providing a connection between an untethered handheld scanner and a host via a wireless link;
   scanning items with the handheld scanner;
   preventing separation of the scanner from the host by the steps of:
      determining distance between the handheld scanner and host by periodically sending and receiving a polling signal between the handheld scanner and the host,
      signaling an alarm when the scanner becomes separated from the host by a distance exceeding a given amount.

23. A method according to claim 22 further comprising
   locating a polling transmitter in the handheld scanner and a receiver in the host, the polling transmitter periodically sending a polling signal to the receiver, sounding the alarm if the receiver does not detect the polling signal within a predetermined time increment.

24. A data reading system according to claim 17 wherein the host comprises a portable data terminal.

25. A method according to claim 22 wherein the host comprises a portable data terminal.

26. A method according to claim 22 wherein the step of signaling the alarm comprises sounding an audible tone.

27. A method according to claim 26 wherein the tone is sounded from the handheld scanner.

28. A method according to claim 26 wherein the tone is sounded from the host.

29. A method according to claim 23 wherein after the alarm is signaled, discontinuing the alarm if the receiver again detects the polling signal within a predetermined time increment.

30. A method according to claim 22 further comprising
   scanning items with the handheld scanner to obtain identification data from optical labels thereon;
   sending the identification data as a regular data signal to the receiver, wherein the regular data signal and the polling signal are combined when sent from the handheld scanner to the host.

* * * * *

UNITED STATES PATENT AND TRADEMARK OFFICE
CERTIFICATE OF CORRECTION

PATENT NO. : 6,572,019 B1　　　　　　　　　　　　　　　　　　　Page 1 of 1
DATED      : June 3, 2003
INVENTOR(S) : Joseph E. Rando and Brad R. Reddersen It is certified that error appears in the above-identified patent and that said Letters Patent is hereby corrected as shown below:

Column 7,
Line 40, before "150A" insert -- holder module --.
Line 56, "150A itself be modified be removable" should read -- 150A may itself be modified to be removably --.

Column 12,
Line 17, "focuses light beam" should read -- focused light beam --.

Column 14,
Line 44, after "wherein" insert -- the --.

Column 15,
Lines 15 and 18, "electromagnet" should read -- electro-magnet --;
Line 19, "electromagnet" should read -- electro-magnet --.

Column 16,
Line 35, "sounding" should read -- signaling --.

Signed and Sealed this

Eleventh Day of May, 2004

JON W. DUDAS
*Acting Director of the United States Patent and Trademark Office*